Figure 1:
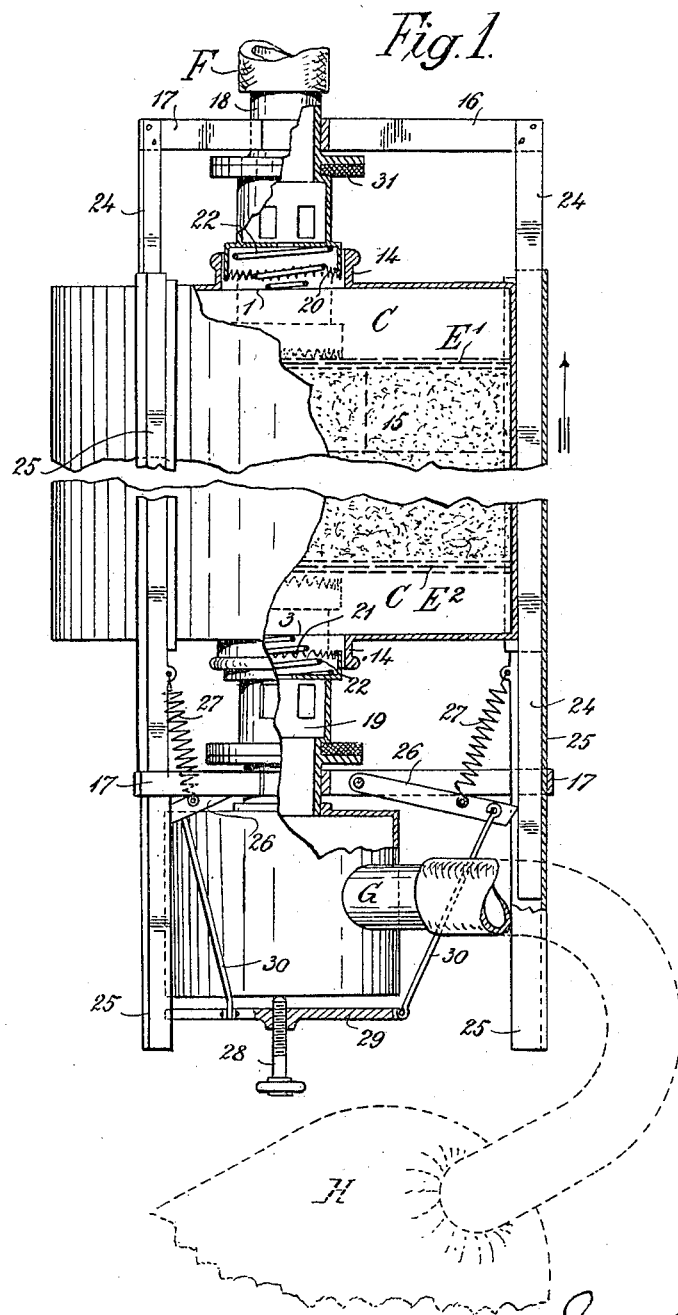

No. 819,704. PATENTED MAY 1, 1906.
M. BAMBERGER, F. BÖCK & F. WANZ.
APPARATUS FOR REOXYGENATING EXHALED AIR FOR RESPIRATION PURPOSES.
APPLICATION FILED NOV. 22, 1905.

2 SHEETS—SHEET 1.

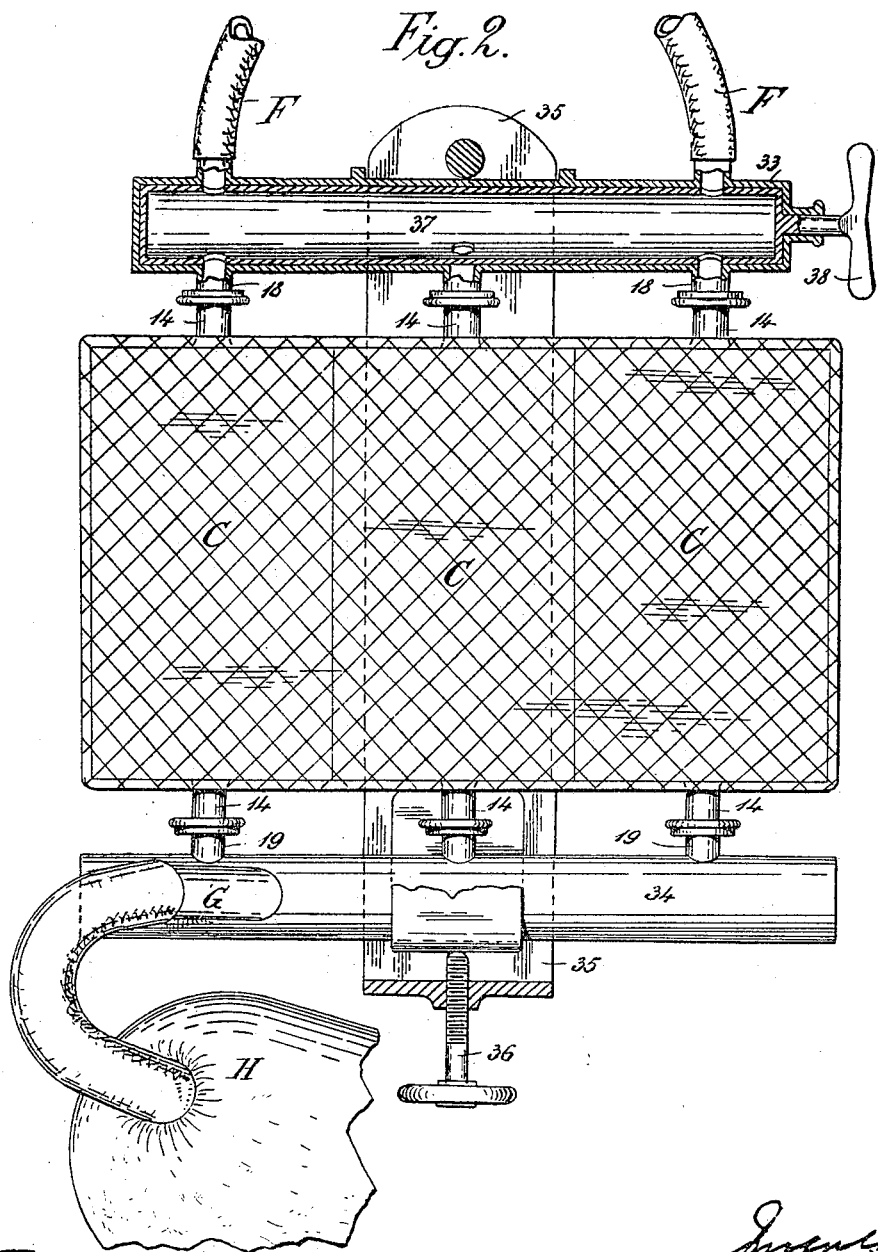

UNITED STATES PATENT OFFICE.

MAX BAMBERGER, FRIEDRICH BÖCK, AND FRIEDRICH WANZ, OF VIENNA, AUSTRIA-HUNGARY.

APPARATUS FOR REOXYGENATING EXHALED AIR FOR RESPIRATION PURPOSES.

No. 819,704.      Specification of Letters Patent.      Patented May 1, 1906.

Application filed November 22, 1905. Serial No. 288,573.

*To all whom it may concern:*

Be it known that we, MAX BAMBERGER, professor at the Polytechnical University of Vienna, FRIEDRICH BÖCK, assistant professor at the Polytechnical University of Vienna, and FRIEDRICH WANZ, engineer, subjects of the Emperor of Austria-Hungary, residing at Vienna, in the Empire of Austria-Hungary, have invented certain new and useful Improvements in Apparatus for Reoxygenating Exhaled Air for Respiration Purposes; and we do hereby declare the following to be a full, clear, and exact description of the invention, such as will enable others skilled in the art to which it appertains to make and use the same.

Our invention relates to apparatus for reoxygenating exhaled air for respiration purposes in which the exhaled air is caused to pass through a porous layer of a peroxid or peroxids which on coming into contact with carbonic dioxid or vapor of water are decomposed into the corresponding oxid or oxids and oxygen, the oxid or oxids forming with the carbonic dioxid and the vapors of water the corresponding carbonate or carbonates and hydroxid or hydroxids, respectively, whereas the oxygen evolved mingles with the exhaled air, rendering it respirable again.

In a former patent, No. 795,678, dated July 25, 1905, we have described an apparatus of this class in which the peroxid or peroxids is or are contained in a hermetically-closed chamber in a receptacle provided with means for establishing a connection between the said chamber and the breathing-space (*i. e.*, a mask for mouthpiece) when the apparatus had to be used. When the contents of the said chamber had been exhausted, the receptacle had to be thrown away.

According to our present invention, we fill the peroxid or peroxids in a vessel hermetically closed afterward and construct the apparatus in such a manner that such vessel or vessels may be readily put into and removed from the same, the means for establishing the communication between the interior of the said vessel or vessels and the breathing-space being permanently attached to the apparatus itself, so that after the contents of the said vessel or vessels have been exhausted the vessel or vessels may be exchanged for fresh ones without the necessity of exchanging any other parts of the apparatus. In this way the apparatus is rendered much cheaper in use.

Further objects of our present invention are to simplify the construction of the apparatus and to increase its reoxygenating capacity.

In the accompanying drawings, Figure 1 is a side elevation, partly in section; and Fig. 2 is a plan view of our improved apparatus.

C is a vessel filled with the peroxid or peroxids to be used which are contained between two filters E' E² in the said vessel.

15 represents partitions of wire-gauze or perforated sheet metal in the space between the filters for preventing the peroxid or peroxids from settling, which would expose an inconveniently great resistance to the passage of the air through the peroxid layer.

14 14 are open nets at opposite ends of the vessel, and 1 and 3 are disks of soft sheet metal—for instance, sheet-lead—soldered or otherwise fixed in the nets for hermetically closing the vessel.

16 and 17 are frames, the former being provided with parallel rods 24 and the latter with parallel guides 25 for such rods, the vessel C being held loosely in the framing or cage formed by these rods and guides. Each of the frames 16 and 17 has secured to it a short tube 18 and 19, respectively. The outer end of tube 18 is connected to a hose F or the like leading to the mask or mouthpiece, and the outer end of the tube 19 is connected to a short tube G, connected by a hose or otherwise to an air-tight receptacle, such as a bag H. The inner ends of the tubes 18 19, which are opposite the nets 14 of the vessel, are provided with a sharp-toothed crown 20 and 21, respectively, light coiled springs 22 and 23, respectively, being located within the said crowns and lateral openings between the said crowns and packing-rings on the tubes.

26 represents pawls pivoted to the frame 17.

27 represents springs tending to hold the pawls against the rods 24, and 30 represents wires or rods connecting the said pawls with a disk 29, through which screws a thumb-screw 28, abutting against some fixed part of the frame 17. The pawls are so proportioned that when their points abut against the rods 24 they are somewhat below the pivots of the pawls, as shown in Fig. 1, so that in this position of the parts the frames 16 and 17 cannot be drawn apart in the direction of the arrow, but may be pushed the one toward the other. If it is desired to draw apart the frame 16 17, it is only necessary to screw in the thumb-screw 28 so as to turn downward the pawls 26, and thereby to bring them out of engagement with the rods 24. We wish it, however, to be understood that instead of the pawls 26 and annexed parts any releasable locking device may be used that while preventing the frames 16 17 from being drawn apart will permit them to be pushed the one toward the other.

Assuming now that the frames 16 17 have been drawn apart, then a vessel C may be inserted into one of these frames—say 17—so that the crown 21 enters the neck 14 of the vessel, the spring 23 preventing the plate 3 from being injured by the crown 21. Then the frame 16 is put onto the frame 17, so that the rods 24 enter the guides 25, and the two frames are pushed the one toward the other until the crown 20 has entered the other neck 14 of the vessel, as indicated in full lines in Fig. 1, the spring 22 preventing any injury to the plate 1. After loosening the thumb-screw 28 to such an extent that the pawls 26 are in engagement with the rods 24, so that the frames 16 and 17 cannot separate accidentally, the apparatus is ready for use. When it has to be used, it is only necessary to push by hand the frames 16 17 the one toward the other. The crowns 20 21 will then first cut through the soft sheet-metal plates 1 and 3, and finally the packing-rings on the tubes 18 19 will come to rest on the edges of the necks 14 14, whereby a free communication from the breathing-space through hose F, the lateral openings in the tube 18, the layer of peroxid or peroxids, and the lateral openings in the tube 19 to the bag H is established, so that on breathing, by means of this apparatus, the exhaled air will be caused to first pass through the peroxid or peroxids and to mingle with oxygen or air in the bag H, and then (on breathing in again) to return to the breathing-space on the same way. The exhaled air is thus thoroughly reoxygenated for respiration purposes, and the entrance of any air from the outside into the apparatus is prevented.

No special provision is made in this apparatus for filling the bag H with oxygen before using the same, as it has been found in practice that it is quite sufficient to vigorously blow twice or thrice into the apparatus made ready for breathing (without breathing in from the same) to fill the bag H to an extent insuring free breathing, provided that the charge in the vessel C is properly selected.

When the vessel C is exhausted, it may be readily exchanged for a fresh one by simply drawing apart the frames 16 17, as above described, removing the exhausted vessel and inserting a fresh one, and putting the apparatus together, as already set forth. The apparatus is then ready for use again. As all the parts attached to the frames 16 and 17 remain unaffected in exchanging the vessels and as the construction and handling of the apparatus is very simple, it will be seen that the improved apparatus offers many advantages over the previous constructions.

We wish it to be understood that our invention is not limited to the exact constructions herein described and shown and that these may be altered within wide limits without departing from the essence of our invention.

We claim—

1. In an apparatus for reoxygenating exhaled air for respiration purposes the combination of a vessel adapted to be filled with a porous layer of a peroxid or peroxids giving off oxygen on coming into contact with exhaled air, means for hermetically closing the same; a frame adapted to hold such vessel or vessels in position, such framing comprising two parts movable the one relatively to the other, means carried by one of the two parts of the framing for putting into communication the interior of the said vessel or vessels with a tube or tubes and means for connecting such tube or tubes with the breathing-space, means carried by the other of the two parts of the framing for putting into communication the interior of the said vessel or vessels with another tube or tubes and means for connecting the latter tube or tubes with a closed receptacle and means for moving the said two parts relatively to each other and for locking them in position, substantially as and for the purpose described.

2. In an apparatus for reoxygenating exhaled air for respiration purposes the combination of a vessel adapted to be filled with a porous layer of a peroxid or peroxids giving off oxygen on coming into contact with exhaled air, openings on opposite ends of such vessel or vessels, sheet-metal plates normally hermetically closing such openings, a framing adapted to hold such vessel or vessels in position such framing comprising two parts movable toward and from such openings, a tube or tubes on each of such parts, a toothed crown at the end of each of such tubes opposite to the said sheet-metal plates, means for connecting the tube or tubes on one of the parts of said framing with a tube or tubes communicating with the breathing-space, means for connecting the tube or tubes on the other of the parts of said framing with a tube communicating with a closed receptacle and means for moving the two parts of the said framing toward and from such openings in the vessels and for locking them in position substantially as and for the purpose described.

3. In an apparatus for reoxygenating exhaled air for respiration purposes the combination of a plurality of vessels adapted to be filled with a porous layer of a peroxid or peroxids giving off oxygen on coming into contact with exhaled air means for hermetically closing the same, a framing adapted to hold such vessels in position, such framing comprising two parts movable the one relatively to the other, means carried by one of the two parts of the framing for simultaneously putting into communication the interiors of the said vessels with a closed receptacle, means carried by the other part of the said framing for simultaneously connecting the interior of the said vessels with a tube, means for connecting the interior of such tube with the breathing-space, means for intercepting the communication between the interior of one or more of the said vessels with the interior of the said tube and for establishing simultaneously the communication between the interior of the remaining vessels with the interior of such tube and means for moving the two parts of the said framing toward and from each other and for locking them in position substantially as and for the purpose described.

4. In an apparatus for reoxygenating exhaled air for respiration purposes the combination of a vessel adapted to be filled with a porous layer of a peroxid or peroxids giving off oxygen on coming into contact with exhaled air means for hermetically closing the same a framing adapted to hold such vessel or vessels in position such framing comprising two parts, one consisting of a frame having attached to it parallel rods and the other consisting of a frame having attached to it parallel guides for such rods, means carried by one of the two parts of the framing for putting into communication the interior of the said vessel or vessels with a tube or tubes and means for connecting such tube or tubes with the breathing-space means carried by the other of the two parts of the framing for putting into communication the interior of the said vessel or vessels with another tube or tubes and means for connecting the latter tube or tubes with a closed receptacle and means for locking against movement of the said parts relatively to each other in one direction and for locking the said two parts of the framing in position, substantially as and for the purpose described.

5. In an apparatus for reoxygenating exhaled air for respiration purposes the combination of a vessel adapted to be filled with a porous layer of a peroxid or peroxids giving off oxygen on coming into contact with exhaled air, means for hermetically closing the same, a framing adapted to hold such vessel or vessels in position, such framing comprising two parts, one consisting of a frame having attached to it parallel rods and the other consisting of a frame having attached to it parallel guides for such rods, means carried by one of the two parts of the framing for putting into communication the interior of the said vessel or vessels with a tube or tubes and means for connecting such tube or tubes with the breathing-space, means carried by the other of the two parts of the framing for putting into communication the interior of the said vessel or vessels with another tube or tubes and means for connecting the latter tube or tubes with a closed receptacle, pawls pivoted to the frame carrying the guides, springs for holding such pawls in engagement with the rods and means for bringing the said pawls out of engagement with the rods, substantially as and for the purpose described.

In testimony whereof we have signed our names to this specification in the presence of two subscribing witnesses.

MAX BAMBERGER.
FRIEDRICH BÖCK.
FRIEDRICH WANZ.

Witnesses:
ARTHUR BAUMANN,
ALVESTO S. HOGUE.